(12) United States Patent
Bauer et al.

(10) Patent No.: US 9,189,120 B2
(45) Date of Patent: Nov. 17, 2015

(54) DEVICE FOR DETECTING THE LOCATION COORDINATES OF A PRESSURE POINT WITHIN A SENSOR FIELD

(75) Inventors: Siegfried Bauer, Linz (AT); Reinhard Schwödiauer, Linz (AT)

(73) Assignee: Universität Linz, Linz (AT)

( * ) Notice: Subject to any disclaimer, the term of this patent is extended or adjusted under 35 U.S.C. 154(b) by 459 days.

(21) Appl. No.: 12/448,398

(22) PCT Filed: Dec. 19, 2007

(86) PCT No.: PCT/AT2007/000576
§ 371 (c)(1),
(2), (4) Date: Jun. 19, 2009

(87) PCT Pub. No.: WO2008/074046
PCT Pub. Date: Jun. 26, 2008

(65) Prior Publication Data
US 2010/0103122 A1    Apr. 29, 2010

(30) Foreign Application Priority Data
Dec. 19, 2006   (AT) ................. A 2090/2006

(51) Int. Cl.
G06F 3/045  (2006.01)
G06F 3/041  (2006.01)
G06F 3/01   (2006.01)
G06F 3/0488 (2013.01)

(52) U.S. Cl.
CPC ...................... *G06F 3/045* (2013.01)

(58) Field of Classification Search
CPC ............... G06F 3/0414; G06F 1/1643

USPC ........... 345/173–179, 156; 250/330; 264/293; 568/487; 200/512; 73/723; 349/12, 349/117; 428/421; 438/724; 118/696; 359/824; 338/47; 430/54, 57.7
See application file for complete search history.

(56) References Cited

U.S. PATENT DOCUMENTS

| 6,323,580 | B1 | 11/2001 | Bernstein | |
|---|---|---|---|---|
| 7,324,095 | B2* | 1/2008 | Sharma | 345/175 |
| 2004/0056877 | A1* | 3/2004 | Nakajima | 345/702 |
| 2004/0263483 | A1* | 12/2004 | Aufderheide | 345/173 |

(Continued)

FOREIGN PATENT DOCUMENTS

| AT | 503 306 | 9/2007 | |
| JP | WO 2006/043660 | * 10/2006 | G06F 3/041 |

(Continued)

OTHER PUBLICATIONS

Lindner et al. "Charged Cellular Polymer with "Ferroelectretic" Behavior", Apr. 2004, vol. No. 2, pp. 255-263.*

(Continued)

*Primary Examiner* — Lin Li
(74) *Attorney, Agent, or Firm* — Collard & Roe, P.C.

(57) ABSTRACT

An apparatus is described for detecting the location coordinates of a pressure point (8) within a sensor field, having at least one electric resistance layer (2) which is connected via electric connections (4) at the edge to a measurement and evaluation circuit (5). In order to become independent of any external supply voltage it is proposed that the electric resistance layer (2) which is provided with at least three electric connections (4) is applied to a ferroic layer (1) made of an internally charged cellular polymer.

2 Claims, 1 Drawing Sheet

(56) References Cited

U.S. PATENT DOCUMENTS

| | | | |
|---|---|---|---|
| 2005/0147745 A1* | 7/2005 | Iijima | 427/180 |
| 2006/0092139 A1* | 5/2006 | Sharma | 345/173 |
| 2006/0144154 A1* | 7/2006 | Ueno et al. | 73/723 |
| 2006/0286316 A1* | 12/2006 | Iijima | 428/32.69 |
| 2007/0262966 A1* | 11/2007 | Nishimura et al. | 345/173 |
| 2010/0224919 A1* | 9/2010 | Bauer et al. | 257/295 |

FOREIGN PATENT DOCUMENTS

| | | | | |
|---|---|---|---|---|
| WO | WO 2004/053909 | | 6/2004 | |
| WO | WO2006/043660 | * | 4/2006 | G06F 3/041 |
| WO | WO 2006/043660 | * | 4/2006 | G06F 3/041 |
| WO | WO 2006/043660 A1 | * | 4/2006 | G06F 3/041 |

OTHER PUBLICATIONS

Charged Celluar Polymers with "Ferroelectretic" Behaviour, IEEE Translation on Dielectrics and Electrical Insulation, Apr. 2004, vol. 11, No. 2, pp. 255-263.*

Charged Cellular Polymers with "Ferroelectric" Behavior, IEEE Transactions on Dielectrics and Electrical Insulation, Apr. 2004, vol. 11, No. 2, pp. 255-263.*

Charged Cellular Polymers with "Ferroelectretic" Behavior, IEEE Transctions on Dielectric and Electrical Insulation, Apr. 2004, Vo. 11, No. 2, pp. 255-263.*

Charged Cellular Polymers with "Ferroeletretic" Behavior, IEEE Transctions on Dieletric and Electrical Insulation, Apr. 2004, vol. 11, No. 2, pp. 255-263.*

Charged Cellular Polymers with "Ferroelectretic" Behavior, IEEE Transctions on Dielectri and Electrical Insulation, Apr. 2004, vol. 11, No. 2 pp. 255-263.*

International Search Report.

Bauer, S. et al., "Ferroelectrets: Polymer-foam space-charge electrets with ferroelectric-like behaviour," International Symposium on Salvador, Bahia, Brazil, Sep. 2005, pp. 24-27. (ISR and Austrian Patent Office).

Lindner et al, "Charged Cellular Polymers with "Ferroelectretic" Behavior," IEEE Transactions on Dielectrics and Electrical Insulation, vol. 11, No. 2, Apr. 2004, pp. 255-263. (Austrian Patent Office).

Bauer, Siegfried, "Piezo-, pyro- and Ferroelectrets: SoftTransducer Materials for Electromechanical Energy Conversion," IEEE Transactions on Dielectrics and Electrical Insulation, vol. 13, No. 5, Oct. 2006, pp. 953-962. (Austrian Patent Office).

* cited by examiner

DEVICE FOR DETECTING THE LOCATION COORDINATES OF A PRESSURE POINT WITHIN A SENSOR FIELD

CROSS REFERENCE TO RELATED APPLICATIONS

This application is the National Stage of PCT/AT2007/000576 filed on Dec. 19, 2007, which claims priority under 35 U.S.C. §119 of Austrian Application No. A 2090/2006 filed on Dec. 19, 2006. The international application under PCT article 21(2) was not published in English.

1. FIELD OF THE INVENTION

An apparatus for detecting the location coordinates of a pressure point within a sensor field, having at least one electric resistance layer which is connected via electric connections at the edge to a measurement and evaluation circuit.

2. DESCRIPTION OF THE PRIOR ART

Apparatuses for detecting a pressure point within a predetermined sensor field are used for various applications, in the form of touchscreens for example. In the case of resistive touchscreens, the fact is made use of that in the case of an electric resistance layer to which an electric direct voltage is applied at two mutually opposite edges, the voltage that can be tapped at a point between the two edges depends on the distance of the tapping point from the edges applied to the voltage. If therefore an electric contact is produced by a pressure-induced bending of the resistance layer in the pressure-point region via a layer arranged at a small distance from the resistance layer, this electric contact can be used to evaluate the voltage prevailing in the pressure point as a measure for the distance of the pressure point from the edges of the resistance layer applied to the voltage. The resistance layer to which the direct voltage is applied forms a potential divider with the electric contact in the region of the pressure point. In order to determine the distance coordinates of the pressure point in a second axis, a resistance layer is to be applied to a direct voltage in this axial direction, so that the location coordinates of the pressure point are obtained from two measurements, with both layers each being able to represent one resistance layer for measuring the location coordinates in one axis. It is also possible to provide only one resistance layer with a conductive layer for tapping the voltage. In this case, the resistance layer is to be applied in an alternating manner to the direct voltages in the direction of the two axes. It is especially disadvantageous in these known resistive touchscreens that they mandatorily require an electric direct voltage supply for their functioning. Moreover, a glass pane is usually provided as a carrier, causing rigid sensor fields.

SUMMARY OF THE INVENTION

The invention is thus based on the object of providing an apparatus for detecting the location coordinates of a pressure point within a sensor field in such a way that a comparatively simple arrangement can be ensured on the one hand and an independence from external voltage sources can be achieved on the other hand.

Based on an apparatus of the kind mentioned above, this object is achieved by the invention in such a way that the electric resistance layer which is provided with at least three electric connections is applied to a ferroic layer made of an internally charged cellular polymer.

The invention is based on the idea of providing the electric charge which is required for the determination of the location of the pressure point within the sensor field by piezo effects when the sensor field is locally subjected to a pressure load, so that the occurring charge can be discharged along a resistance layer. The current thus caused can be measured via electric connections, which current depends on the electric resistance of the resistance layer between the pressure point corresponding to the charge source and the respectively electric connection, and thus from the distance of the pressure point from the respective connection. In order to compensate the dependence of the produced charge and thus the current from the applied pressure, at least three electric connections must be provided.

The piezoelectric effects required for providing respective charges are advantageously enabled by a ferroic layer, which means a material whose symmetry can be changed by temperature or pressure, as is utilized in ferroelectric and/or ferromagnetic components. Flexible layers with quasi ferroelectric properties are obtained when cellular polymers are charged permanently internally by microplasma discharges. Especially foamed non-polar polymers which are excellent insulators are especially suitable for such charges. The precondition for internal charging is an ionization of the gas in the cellular cavities, so that free charge carriers in the form of electrons and ions are present. Piezoelectric effects can be determined in addition to effects comparable to ferroelectric properties in an external electric field, which occurs as a result of the different elastic properties of the gas in the cavities of the cellular polymer and the polymer itself. This leads to very low dynamic piezoelectric coefficients $d_{31}$ of 250 pC/N for example, so that the electric voltages caused by the shearing forces can often be neglected, which is of relevance in connection with a bending of the ferroic layer because charge effects through a bending deformation of the flexible cellular polymers can remain unconsidered in the determination of location coordinates of a pressure point. Since the electric resistance layer is applied to the ferroic layer, the charge caused by a pressure load of the ferroic layer is discharged via the resistance layer to the connections. A distinct determination of location of the pressure point is possible through the ratio of the measured discharge currents via a connected measurement and evaluation circuit. If more connections of the resistance layer are provided than are required for distinct determination of location, it is also possible to detect several pressure points, which is relevant for a number of applications.

Especially advantageous constructional conditions are obtained when the ferroic layer is arranged in a capacitive structure between two cover layers, of which one forms the electric resistance layer and the other an electrically conductive layer, so that distinct voltage conditions are obtained between the cover layers during the occurrence of a charge.

Ferroic layers made of an internally charged cellular polymer are not transparent. This does not play a role in connection with display fields to be provided when the ferroic layer provided with the electric resistance layer forms a carrier for the display field, which can comprise light-emitting, organic diodes, as is known. It needs merely to be ensured that a sufficient pressure load of the ferroic layer by the applied display field is ensured. As a result of the flexibility of the ferroic layer, a bending deformation of the ferroic layer provided with the display field can be ensured. It merely needs to be ensured that there is a respective flexibility of the display field.

BRIEF DESCRIPTION OF THE DRAWINGS

The subject matter of the invention is shown by way of example in the drawings, wherein.

DESCRIPTION OF THE PREFERRED EMBODIMENT

Figure 1:
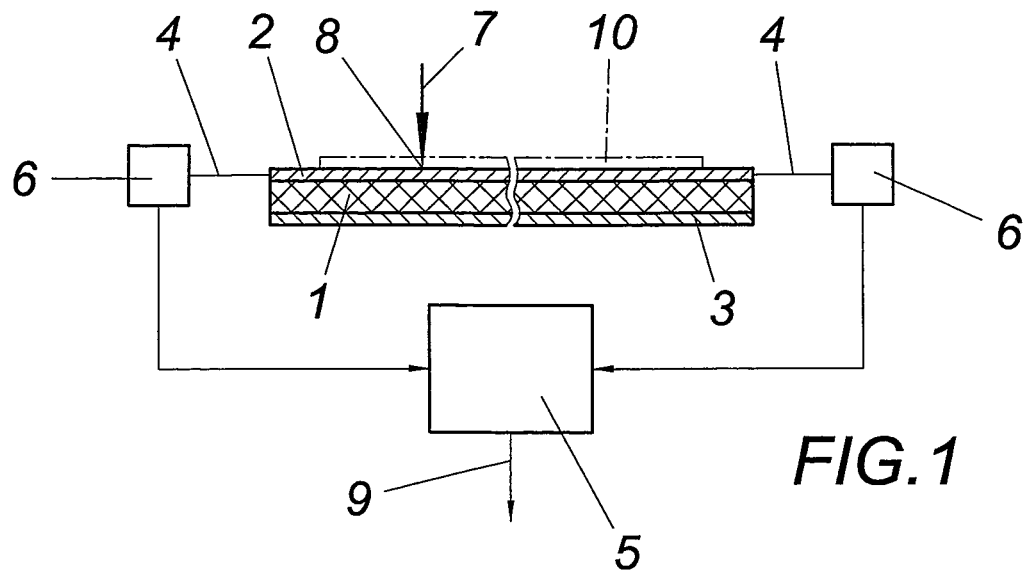
FIG. 1 shows an apparatus in accordance with the invention for detecting the location coordinates of a pressure point within a sensor field in a schematic cross-sectional view.
Figure 2:
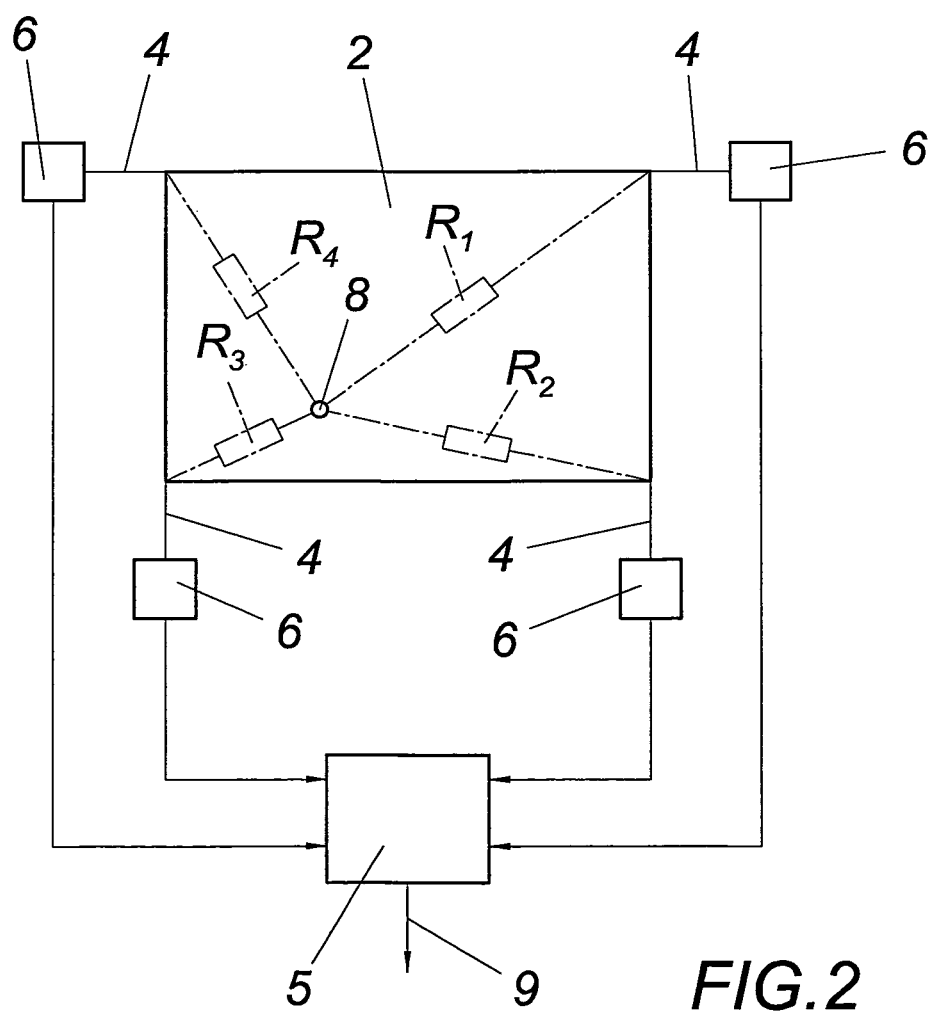
FIG. 2 shows this apparatus in a schematic top view.

The illustrated apparatus for detecting the location coordinates of a pressure point comprises a ferroic layer 1 made of an internally charged cellular polymer between two cover layers, of which the one forms an electric resistance layer 2, whereas the other represents an electrically conductive layer 3. The electric resistance layer 2 is provided with electric connections 4 at the edge, through which the apparatus is connected with a measurement and evaluation circuit 5 which comprises separately shown current measuring devices 6 in the region of each connection 4. When the ferroic layer 1 is locally subjected to pressure, as is illustrated in FIG. 1 by force 7, then this pressure will cause a charge as a result of the piezoelectric properties of the ferroic layer 1 and thus a respective voltage between the resistance layer 2 and the conductive layer 3. This charge is discharged via the connections 4 through the resistance layer 2, with the measured discharge currents being evaluated in the measurement and evaluation circuit 5 for determining the location coordinates of the pressure point 8. As is shown in the equivalent circuit diagram indicated in FIG. 2 with the dot-dash line, the resistance layer 2 represents ohmic resistors $R_1$, $R_2$, $R_3$ and $R_4$ between the pressure point 8 and the connections 4, which resistors co-determine the magnitude of the discharge currents discharged via the connections 4, so that with the proportion in magnitude of the measured currents it is possible to draw conclusions of the resistance conditions and thus the distance of the pressure point 8 from the connections 4. The location coordinates of the pressure point 8 can be made available via an output 9 of the measurement and evaluation circuit 5 without requiring an external voltage source. Moreover, the ferroic layer 1 made of a cellular polymer is flexible, so that the sensor field for the detection of the location coordinates of a pressure point, which field is determined by the resistance layer 2, can be subjected to a bending deformation. This bending deformation does not have a disadvantageous effect on the result of the measurement due to the low piezoelectric coefficient $d_{31}$.

In order to enable connecting the display field with the sensor field, the ferroic layer 1 with the resistance layer 2 must act as a carrier for such a display field because the ferroic layer 1 made of a cellular polymer is opaque. FIG. 1 shows such an additional display field with a dot-dash line and is provided with reference numeral 10.

The invention claimed is:

1. An apparatus for detecting location coordinates of a pressure point within a sensor field, the apparatus having:
    a measurement and evaluation circuit;
    at least one electric resistance layer having an edge and at least three electric connections at the edge and connected via the at least three electric connections to the measurement and evaluation circuit,
    an internally-charged cellular polymer; and
    an electrically conductive layer;
    wherein the at least one electric resistance layer is applied directly to a first side of the internally-charged cellular polymer so that the at least one electric resistance layer forms a first cover layer;
    wherein the electrically conductive layer is applied directly to a second side of the internally-charged cellular polymer so that the electrically conductive layer forms a second cover layer, the second side being opposite from the first side;
    wherein a pressure load on the internally-charged cellular polymer at a pressure point causes a charge from the internally-charged cellular polymer to be discharged as currents along the at least one electrical resistance layer;
    wherein the measurement and evaluation circuit comprises a respective current measuring device in the region of each electric connection so that the location coordinates of any pressure point within the at least one electric resistance layer can be calculated using a ratio of the respective currents at the at least three electric connections;
    wherein the internally-charged cellular polymer is continuous,
    wherein the at least one electric resistance layer is applied to the internally-charged cellular polymer to be disposed continuously on the internally-charged cellular polymer such that the sensor field is formed to be continuous; and
    wherein a voltage condition occurs between the first cover layer and the second cover layer during the occurrence of the charge at the pressure point.

2. The apparatus according to claim 1, further comprising a flexible display field applied to the at least one electric resistance layer, and
    wherein the at least one electric resistance layer and the internally-charged cellular polymer form a flexible carrier for the flexible display field.

* * * * *